No. 765,218. Patented July 19, 1904.

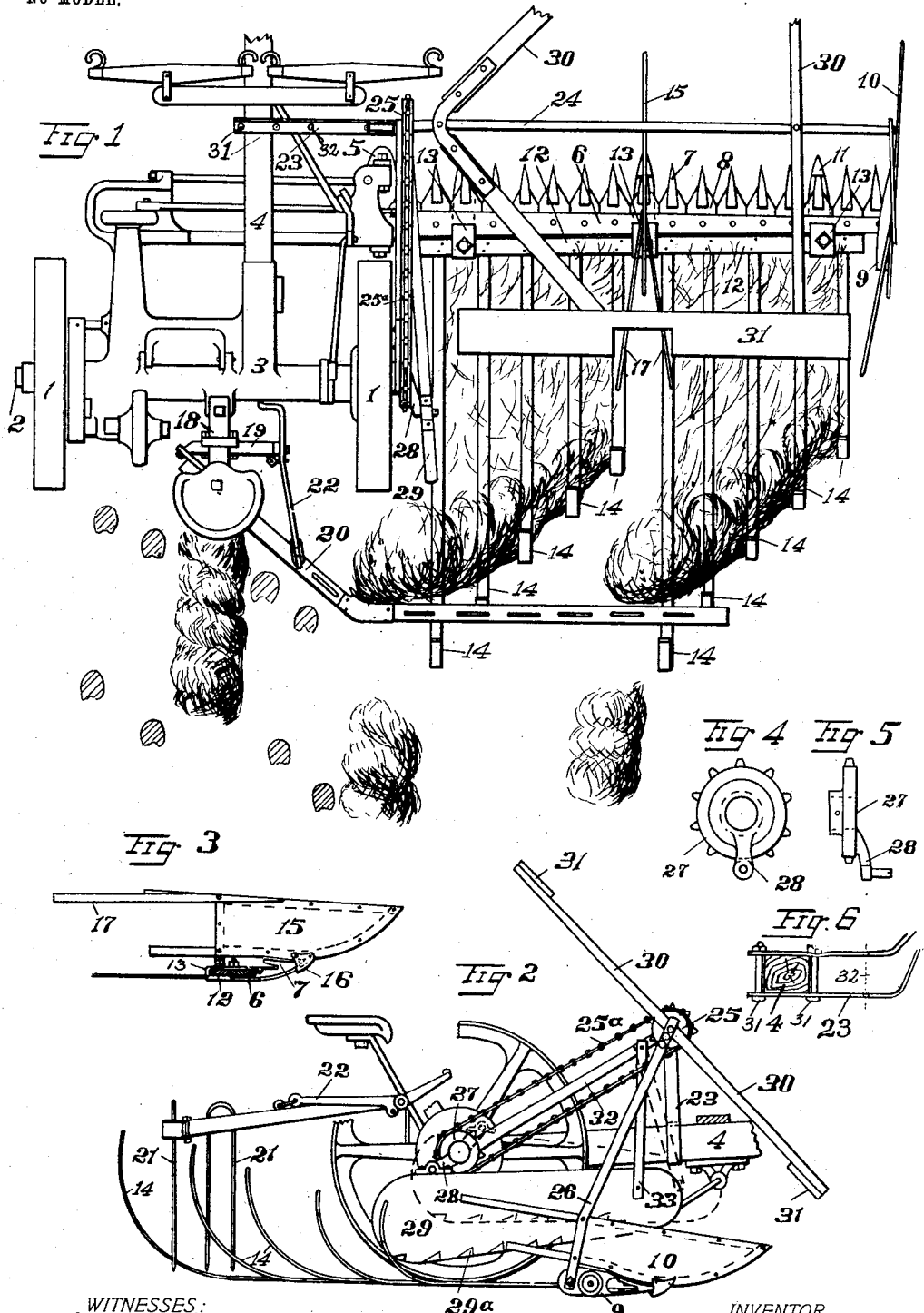

UNITED STATES PATENT OFFICE.

WILLIAM N. WHITELY, OF SPRINGFIELD, OHIO.

HARVESTER.

SPECIFICATION forming part of Letters Patent No. 765,218, dated July 19, 1904.

Application filed October 16, 1903. Serial No. 177,334. (No model.)

*To all whom it may concern:*

Be it known that I, WILLIAM N. WHITELY, a citizen of the United States, residing at No. 153 East High street, Springfield, in the county of Clark and State of Ohio, have invented certain new and useful Improvements in Harvesters; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in harvesters, and more particularly relates to hay-making attachments for mowing-machines.

One object of my invention is to provide means by which the cut crop is delivered rearward and stubbleward in a rolled condition in small windrows with the butts of the cut crop turned outward, so as to enable the cut crop to dry and cure more rapidly and uniformly than if the full width of the cut swath was delivered in a single windrow; also, that said windrows may be so deposited that a suitable space is provided between said windrows for the free passage of the team and wheels of the machine without running over or tramping on same and the cut crop left in a loose condition for drying.

A further object of my invention is that by cutting and delivering the cut crop in small windrows each separated from the other they will dry out quickly and evenly and that the cut crop is left in a condition that it can be easily and readily gathered by a hay-loader, thus saving the time and expense of a hay-tedder and hay-rake to prepare the cut crop for drying and deliver it in windrows; but by my invention the crop is cut, gathered, and delivered in windrows as cut and left in the best possible condition for drying rapidly without the use of a hay-tedder or hay-rake, the windrows being so delivered from the machine that neither the team nor the machine run over same when cutting the next swath, thus leaving the windrows in a loose condition for drying.

I attain these objects by the mechanism illustrated in the accompanying drawings, which are made a part of this specification, in which—

Figure 1 is a harvesting-machine of the ordinary type equipped with my improvements, showing the longitudinally-divided slatted platform attached to the finger-bar, the forward ends of the slats of each division adapted to slide on the stubble, the rearward ends of the slats of each division curved upwardly, the slats at the stubbleward side of each division of the slatted platform longer than the slats at the grassward side of each division for side-delivery purposes, so as to deliver the cut crop in windrows from the stubbleward side of each division of the platform in a rolled loose condition for drying. It also shows the manner of collecting and delivering the cut crop from the platform in a rolled condition and out of the way of the team and machine when cutting the next swath. Fig. 2 is a side elevation of the above, the vibrating shield shown in heavy lines in its farthermost rearward and downward position, the dotted lines showing said shield in its farthermost upward and forward position, also showing the notches in the bottom edge of said vibrating shield to engage with and move the cut crop rearward on the platform as the machine moves forward. Fig. 3 is a detail side elevation of the divider secured to the finger-bar at the junction-point of the two divisions of the slatted platform, so as to divide and separate the cut crop and direct the cut crop so divided onto each division of the slatted platform, one located grassward of and one located stubbleward of said divider, as shown in Fig. 1. Fig. 4 is a detail side elevation of the chain-wheel secured to the main axle or master-wheel of the machine, also the crank connected to said wheel. Fig. 5 is a detail rear elevation of said wheel and crank. Fig. 6 is a detail rear elevation, partly in section, showing the tongue or pole and means for lateral adjustment of the supporting clamping-bracket on the pole or tongue.

Similar reference-figures refer to similar parts throughout the several views.

In said drawings, 1 1 represent the main driving and supporting wheels.

2 represents the main axle, passing through and supporting the main frame 3 and supported by said master-wheels 1 1. To the main frame 3 is rigidly connected the tongue 4, by which the machine is propelled over the ground.

5 represents the main shoe, which is connected to and supported by the main frame 3.

6 represents the finger-bar, which is rigidly connected to said shoe 5. To said finger-bar 6 is rigidly secured a series of guard-fingers 7, through which reciprocates the knife 8, which severs the stalks of the crop to be cut as the machine moves forward.

9 represents the outer shoe, secured to the grassward end of the finger-bar 6. Attached to said shoe 9 is the divider 10, its forward end inclined upward and extending forward into the uncut crop to divide and separate the crop in advance of the cutters, its rearward end extending rearward of said finger-bar 6 and shoe 9 and over the grassward part of the grassward division of the slatted platform to prevent the cut crop from falling grassward of the outer shoe 9 and also to start the cut crop stubbleward on said slatted platform. Secured to said finger-bar 6 in rear thereof by means of the overshoe 11, fitting over the point of the guard-finger 7 and extending rearward, are the transverse bars 12 12, which are secured to said finger-bar 6 by means of the clamps 13, which bind and hold said transverse bars 12 12 to said finger-bar 6, as shown in Fig. 1. Secured to said transverse bars 12 12 are a series of rearwardly-extending slats 14, the forward ends of said slats sliding on the stubble, the rearward ends of said slats 14 curved upwardly on a diagonal line across the travel of the machine, as shown in Figs. 1 and 2, the grassward slats of each division of said slatted platform shorter than the slats at the stubbleward side and increasing in length from the grassward to the stubbleward side of each division of said platform, as shown in Fig. 1. Rigidly secured to said transverse bars 12 12 at their meeting ends near the middle of the finger-bar 6 is the divider 15, as shown in plan in Fig. 1 and in detail in Fig. 3. To the lower edge of said divider 15 is secured or otherwise formed a socket 16, which fits over one of the guard-fingers 7, as shown in Fig. 3, the rearward end of said divider 15 supported by and connected to the clamp 13, which connects and holds the meeting ends of said transverse bars 12 12 together and also holds same to said finger-bar 6. The rearward upper portion of said divider 15 is preferably formed bifurcated, as shown in plan in Fig. 1, in which I employ rearwardly-extending prongs 17 17, connected to and extending rearward from the main portion of said divider 15, so that the rearward ends of said prongs 17 17 are a considerable distance apart, as shown in Fig. 1. These prongs 17 17 may be formed integral with the main portion of the divider 15 or may be additional parts connected thereto. The object of said divider 15 is not only to make a complete separation of the crop, but that the crop so divided is turned stubbleward and grassward as cut from said divider 15 onto the two divisions of the slatted platform, as shown in Fig. 1—that is, that portion of the cut crop grassward of said divider 15 is directed onto the grassward division of said slatted platform and that portion of the cut crop stubbleward of said divider 15 is directed onto the stubbleward division of said slatted platforn m, as shown.

Rigidly connected to the seat-support 18 is the clamp 19, as shown in Fig. 1. To the stubbleward end of said clamp 19 is pivotally connected the stubbleward end of the rake-arm 20, as shown in Fig. 1, said arm extending rearward and grassward from its pivotal connection to the machine, the grassward portion of said arm provided with a series of downwardly-projecting teeth 21, as shown in Fig. 2, forming a rake located at the rearward end of the slats 14 of said platform to collect and hold the accumulated cut crop on said platform as the machine moves forward and until desired to be discharged by the operator. Pivotally connected to the grassward end of said clamp 19 is the lever 22, which may be operated by the hand or foot of the operator, as desired, said lever 22 extending in a rearward direction from said clamp 19 and pivotally connects to the rake-arm 20 at a convenient point, that said rake-arm 20 may be quickly and easily raised by the operator to discharge the accumulated cut crop from the slatted platform when desired.

Detachably connected to the tongue 4 is the bracket 23, as shown in Figs. 1 and 6, said bracket extending upward and grassward from said tongue 4. In the upper end of said bracket 23 is journally mounted and supported the reel-shaft 24, said reel-shaft 24 supported at its grassward end by means of the reel-post 26, the lower end of which is connected to and supported by the outer shoe 9 and divider 10, as shown in Fig. 2. It will be observed that I provide means in the upper end of said reel-post 26, as shown in Fig. 2, for adjustment of said reel-shaft 24 up and down, as desired, to accommodate itself to the different lengths of crops to be cut. Rigidly secured to the stubbleward end of said reel-shaft 24 and turning with said shaft is the toothed wheel 25, from which extends rearward the chain or link belt 25ª, which engages with and is driven by the toothed wheel 27, mounted upon the grassward end of the main axle 2, or may be secured to the grassward driving-wheel 1. Secured to said wheel 27 is a crank 28, which journally connects to the rearward end of the vibrating shield 29, said shield 29 located and operating grassward of the grassward driving-wheel and stubbleward of the receiving-platform, said shield 29 being made of considerable length and extending from front to rear of the truck portion of the machine, the forward end of said shield 29 being pivotally connected to the downwardly-projecting link 33, the upper end of said link 33 pivotally connected to the brace-bar 32, which extends forward and upward from the main axle 1 to said reel-shaft 24 for the purpose of supporting and steadying said reel-shaft 24 and to keep said chain $25^a$ taut, said vibrating shield 29 provided with notches $29^a$, so arranged as to slide over the cut crop in the forward and upward movement of said shield 29 and to engage with the cut crop in its downward and rearward movement to press down and move the cut crop rearward on the slatted platform, and while I show said vibrating shield provided with notches to engage and move the cut crop rearward other means may be employed for this purpose, such as frets or ledges properly arranged on said shield, said vibrating shield 29 having an orbital movement to pass over the cut crop in its forward and upward movement and onto and into the cut crop in its downward and rearward movement, so as to move the cut crop rearward on the slatted platform and to prevent the accumulating cut crop from engaging with and clogging the grassward driving-wheel of the machine. Secured to said reel-shaft 24 are reel-arms 30, which extend outward from said reel-shaft 24, as shown in Figs. 1 and 2. To the outward ends of said arms 30 are secured the reel-blades 31, said reel-blades 31 being sufficiently divided, as shown in Fig. 1, near their middle, that said reel-blades 31 will in the operation of the machine extend downward lower than the topmost portion of said divider 15, so as to press the crop rearward against the cutters and deliver the crop when cut on the platform.

While my construction of a longitudinally-divided slatted platform, as herein shown and described, will work best on wide-cut machines, it will also operate on mowing-machines of narrow width.

The two crop-dividers, one located at the grassward side of the finger-bar and one located about central of the length of the finger-bar, and the two divisions of the slatted platform, each acting independently of the other, are to divide the crop of the main swath into two divisions, so as to form two windrows, one windrow to be straddled on the second round by the master-wheels and team. The reel-blades should be sufficiently divided near their middle, that in operation the blades will extend downward lower than the topmost part of the divider, so as to press the uncut crop backward against the cutters and deliver the cut crop on the platform and also to separate it. The two divisions of the slatted platform act in conjunction with the stubble to roll the cut crop over and sidewise, so as to turn the butts of the stalks outward and the heads inward of the rolls, in which condition it will dry out very quickly and is left in a good position on the ground to be followed by a hay-loader of any of the well-known types, which takes up any number of the windrows that come within the width of the hay-loader, and being in windrows the lifting of the crop is much facilitated and the harvesting made easy.

It will be observed that the vibrating shield between the grassward side of the grassward driving-wheel and the crop-receiving slatted platform acts to shield the grassward master-wheel and to agitate and move the crop rearward as cut, so that it will not clog the master-wheel and impede the proper working of the machine. This vibrating shield is shown with notches, that will slide over the crop in moving forward and will take hold of and press into and move the crop rearward in its operation. Said vibrating shield should be of considerable length, extending from front to rear of the truck part of the machine, and as it is constantly in motion up, down, back, and forth the cut crop is easily kept in motion.

Heretofore when shields were employed they were stationary, and the cut stalks would accumulate and often lie against the shield and very much impede the working of the machine.

While I show a very convenient mechanical device for supporting and moving this vibrating shield, it is evident that said shield may be supported and operated by other means than that shown. The shield may be made in any convenient form for the purpose and may be set at different angles and may be speeded to move faster or slower, if desired, and attach directly to the driving-wheel. Hence I do not consider myself limited to any peculiar form of construction or manner of imparting motion to same, as any form of vibrating shield longitudinally disposed with the forward movement of the machine will answer the purpose and come within the spirit of my invention.

It will be observed from my construction that the support for the stubbleward end of the reel is detachably connected and clamped to the pole or tongue of the machine by means of the bolts 31 31, as shown in Figs. 1 and 6, so that the support may be longitudinally and laterally adjusted on the tongue or pole of the machine, one of said bolts 31 passing through the two members of said support 23 on the stubbleward side of the tongue 4, while another of said bolts passes through the two members of said support on the grassward side of the tongue 4, as shown in Figs. 1 and 6, and by loosening said bolts 31 31 said support can be moved longitudinally forward or backward on said tongue, and when it is desired to move said support laterally on said tongue said bolts 31 31 are removed and one of the bolts placed in the hole 32, which I have provided in said support, as shown in Figs. 1 and 6, and the support moved stubbleward on said tongue 4 until the bolt is against the grassward side of said tongue, when the other bolt is inserted through said support on the stubbleward side of the tongue, after which said bolts 31 31 are tightened, thus securely clamping said support in its adjusted position to said tongue. The purpose of said longitudinal and lateral adjustment is to adapt my improvements to the different makes of machines in use and to locate the reel in any position desired without making holes in the tongue or pole to connect said support, which in addition to weakening the pole or tongue would deface and injure same. The two members composing my reel-support oppose each other, thus forming a clamp on the pole or tongue that will admit of longitudinal and lateral adjustment on the pole or tongue, which I consider very essential, as the pole or tongue may vary in location in relation to the grassward driving-wheel. On some machines the pole or tongue may be located closer to the grassward driving-wheel, while in others the pole or tongue may be located farther from the grassward driving-wheel; but by means of the adjustment provided in my construction my improvements may be attached to the different makes of machines in use without making holes in the tongue or pole or defacing or injuring the machine in any manner.

What I claim, and desire to secure by Letters Patent, is—

1. In a harvesting-machine, in combination, a finger-bar, a longitudinally-divided slatted platform connected to said finger-bar and adapted to slide on the stubble, the stubbleward slats of each division longer than the grassward slats, the rearward ends of the slats of each division curved upwardly on a diagonal line across the path of the machine for side delivery of the crop, each division acting independently of the other to form a separate windrow from that formed by the other division at the same time as the machine moves forward.

2. In a harvesting-machine, in combination, a finger-bar, a crop-separating divider located over said finger-bar between the stubbleward and grassward ends of said bar to separate the crop as being cut into two divisions, a longitudinally-divided slatted platform connected to said finger-bar and adapted to slide on the stubble, the stubbleward slats of each division longer than the grassward slats, the rearward ends of the slats of each division curved upwardly on a diagonal line across the path of the machine for side delivery of the crop, each division of said platform acting independently of the other to form a separate windrow from that formed by the other division at the same time as the machine moves forward.

3. In a harvesting-machine, in combination, a finger-bar, a longitudinally-divided slatted platform connected to said finger-bar in rear thereof and adapted to slide on the stubble, the stubbleward slats of each division longer than the grassward slats, the rearward ends of the slats of each division curved upwardly on a diagonal line across the path of the machine for side delivery of the crop in two windrows, a rake pivotally mounted upon the truck portion of the machine and projecting rearward and grassward therefrom and adapted to be lowered to arrest the crop on each division of said platform and raised to discharge the crop in bunches as the machine moves forward.

4. In a harvesting-machine, in combination, a finger-bar, a crop-receiving platform connected to said finger-bar in rear thereof, a driving and supporting wheel for said machine located at the stubbleward side of said platform, a vibrating shield extending longitudinally along the grassward side of said driving-wheel, means to support and vibrate said shield back and forth in a line with the forward path of the machine to protect said wheel and assist in moving the cut crop rearward as the machine moves forward.

5. In a harvesting-machine, in combination, a finger-bar, a crop-receiving platform connected to said finger-bar in rear thereof, a driving and supporting wheel for said machine located at the stubbleward side of said platform, a crank actuated by said driving-wheel, a shield located between said driving-wheel and said platform extending in the direction of the path of the machine, a link pivotally connecting the forward end of said shield to the machine, said crank connected at the rearward end to said shield, said crank and link acting to impart an orbital movement to said shield to protect said wheel and move the cut crop rearward as the machine moves forward.

6. In a harvesting-machine, in combination, a finger-bar, two crop-dividers, one located at the grassward end of the finger-bar, one located centrally of the length of said finger-bar to divide the crop before cut, a longitudinally-divided slatted platform connected to said finger-bar in rear thereof and adapted to slide on the stubble, each division adapted to receive its portion of the divided crop, a reeling mechanism, the blades notched about the middle of their length, each part adapted to work below the top portion of said central divider and near thereto to move the crop rearward to clear the cutters and when cut to deliver it divided upon said platform.

7. In a harvesting-machine, in combination, a finger-bar, a crop-receiving platform connected to said finger-bar, a driving and supporting wheel at the stubbleward side of said platform, a vibrating shield located between said driving-wheel and said platform longitudinally disposed in the direction of the travel of the machine, notches in or formed on said shield to assist in moving the cut crop rearward as the machine moves forward.

In testimony whereof I affix my signature in presence of two witnesses.

WILLIAM N. WHITELY.

Witnesses:
    JOHN L. GILLIGAN,
    ROBERT WEISKOTTEN.